United States Patent [19]

MacKenzie et al.

[11] Patent Number: 5,374,694
[45] Date of Patent: Dec. 20, 1994

[54] CURABLE BLENDS OF CYANATE ESTERS AND POLYARYLSULPHONES

[75] Inventors: Paul D. MacKenzie, Cleveland; Robin K. Maskell, Chester, both of England

[73] Assignee: ICI Composites Inc., Tempe, Ariz.

[21] Appl. No.: 55,392

[22] Filed: May 3, 1993

Related U.S. Application Data

[63] Continuation of Ser. No. 762,078, Sep. 18, 1991, abandoned, which is a continuation of Ser. No. 391,279, Aug. 9, 1989, abandoned.

[51] Int. Cl.$^5$ ............................................... C08L 81/06
[52] U.S. Cl. ...................................... 525/535; 525/534
[58] Field of Search ............................ 525/534, 535

[56] References Cited

U.S. PATENT DOCUMENTS

| | | | |
|---|---|---|---|
| 4,414,366 | 8/1983 | Sugio et al. | 525/439 |
| 4,804,740 | 2/1989 | Gardner et al. | 525/523 |
| 4,902,752 | 2/1990 | Shimp | 525/535 |
| 4,918,157 | 4/1990 | Gardner et al. | 525/534 |
| 4,931,496 | 6/1990 | Qureshi et al. | 525/535 |
| 4,972,031 | 11/1990 | Choate et al. | 525/535 |
| 4,996,267 | 2/1991 | Gerth et al. | 525/423 |

FOREIGN PATENT DOCUMENTS

| | | |
|---|---|---|
| 311349 | 4/1989 | European Pat. Off. . |
| 326931 | 8/1989 | European Pat. Off. . |
| 311341 | 12/1989 | European Pat. Off. . |
| 3111403 | 1/1982 | Germany . |
| 57-165451 | 10/1982 | Japan . |

*Primary Examiner*—James J. Seidleck
*Assistant Examiner*—Thomas Hamilton, III
*Attorney, Agent, or Firm*—John M. Sheehan

[57] ABSTRACT

A curable polymer composition comprising a polyarylsulphone thermoplastic component and a polymerizable cyanate ester thermoset component.

10 Claims, No Drawings

CURABLE BLENDS OF CYANATE ESTERS AND POLYARYLSULPHONES

This is a continuation of copending application Ser. No. 07/762,078 filed on Sep. 18, 1991 which itself is a continuation of 07/391,279 filed on Aug. 9, 1989, now abandoned.

BACKGROUND OF THE INVENTION

1. Field of the Invention

This invention relates to a polymer composition and more particularly to a composition containing a thermosettable cyanate resin precursor and a thermoplast effective to make said resin tougher when cured. It relates to also such a composition containing reinforcing fibres and to cured resin structures made of such a composition.

2. Description of Prior Art

Thermoset resins have been used for many years to make strong non-metallic structures, but have had somewhat limited fields of application because they are brittle. U.S. Ser. No. 253,596, filed Oct. 5, 1988, now abandoned, describes a polymer composition providing a useful improvement in fracture toughness and briefly reviews earlier attempts to meet this requirement. Whereas that U.S. Ser. No. mentions in a general way that the thermoset component of its compositions may be a cyanate resin, we have now identified particular compositions affording a significant advance in performance.

SUMMARY OF THE INVENTION

The invention provides in its first aspect a curable polymer composition comprising a polymerisable cyanate ester thermoset component and a polyarylsulphone thermoplast component containing ether- and/or thioether-linked repeating units $(PhSO_2Ph)_n$ and $(Ph)_a$ where Ph is phenylene, a and n are independently 1 to 2 and may be on average fractional and the phenylenes in $(Ph)_a$ are linked by a single chemical bond.

In the polyarylsulphone component the relative proportions of the said repeating units is such that on average at least two units $(PhSO_2Ph)_n$ are in immediate mutual succession in each polymer chain present and is preferably in the range 1:99 to 99:1, especially 10:90 to 90:10, respectively. Typically the ratio is in the range 25-50 $(Ph)_a$, balance $(Ph\ SO_2\ Ph)_n$. In preferred polyarylsulphones the units are I X Ph $SO_2$ Ph X Ph $SO_2$ Ph ("PES"); and
II X$(Ph)_a$ X Ph $SO_2$ Ph ("PEES")

where X is O or S and may differ from unit to unit; the ratio of I to II (respectively) preferably between 10:90 and 80:20 especially between 10:90 and 55:45.

The relative proportions of the repeating units of the polyarylsulphone may be expressed in terms of the weight percent $SO_2$ content, defined as 100 times (weight of $SO_2$)/(weight of average repeat unit). A preferred $SO_2$ content is at least 22, preferably 23 to 25%. When a=1 this corresponds to PES/PEES ratios of at least 20:80, preferably in the range 35:65 to 65:35.

The above proportions refer only to the units mentioned. In addition to such units the polyarylsulphone may contain up to 50 especially up to 25% molar of other repeating units: the preferred $SO_2$ content ranges (if used) then apply to the whole polymer. Such units may be for example of the formula

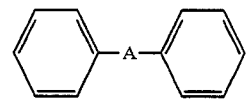

in which A is a direct link, oxygen, sulphur, —CO— or a divalent hydrocarbon radical. When the polyarylsulphone is the product of nucleophilic synthesis, its units may have been derived for example from one or more the following bisphenols and/or corresponding bisthiols or phenol-thiols:
hydroquinone
4,4'-dihydroxybiphenyl
resorcinol
dihydroxynaphthalene (2,6 and other isomers)
4,4'-dihydroxydiphenyl ether or -thioether
4,4'-dihydroxybenzophenone
2,2'-di-(4-hydroxyphenyl)-propane or -methane.

If a bis-thiol is used, it may be formed in situ, that is, a dihalide as described for example below may be reacted with an alkali sulphide or polysulphide or thiosulphate.

Other examples of such additional units are of the formula

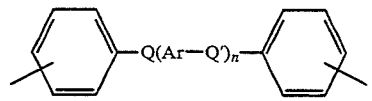

in which Q and Q', which may be the same or different, are CO or $SO_2$; Ar is a divalent aromatic radical; and n is 0, 1, 2, or 3, provided that n is not zero where Q is $SO_2$. Ar is preferably at least one divalent aromatic radical selected from phenylene, biphenylene or terphenylene. Particular units have the formula

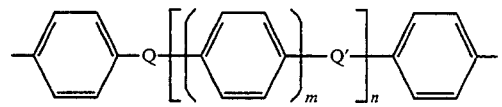

where m is 1, 2 or 3. When the polymer is the product of nucleophilic synthesis, such units may have been derived from one or more dihalides, for example:
4,4'-dihalobenzophenone
4,4' bis-(4-chlorophenylsulphonyl)biphenyl
1,4 bis-(4-halobenzoyl)benzene
4,4'-bis-(4-halobenzoyl)biphenyl They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event fluoride is usually more active than chloride. Any nucleophilic synthesis of the polyarylsulphone is carried out preferably in presence of one or more alkali metal carbonates in up to 10% molar excess over the stoichiometric and of an aromatic sulphone solvent, at a temperature in the range 150°–350° C.

If desired, the polyarylsulphone may be the product of electrophilic synthesis.

The polyarylsulphone preferably contains end groups and/or pendant groups of formula —A—Y where A is a divalent hydrocarbon group, preferably aromatic, and Y is a group reactive with cyanate groups or with a curing agent or with like groups on other polymer molecules. Examples of Y are groups providing active hydrogen especially OH, $NH_2$, NHR or —SH, where R is a hydrocarbon group containing up to 8 carbon atoms, or providing other cross-linking reactivity especially epoxy, cyanate, isocyanate, acetylene or ethylene, as in vinyl, allyl, propenyl or maleimide.

The number average molecular weight of the polyarylsulphone is suitably in the range 2000 to 60000. Preferably it is over 5000 especially over 10000 for example 11000 to 25000 and structurally as well as by chemical interaction increases toughness by comparison with that of the thermoset resin alone by providing zones of the tough thermoplast between cross-linked thermoset zones. Another useful subrange is 3000–11000, especially 3000–9000 in which it acts more as a chain-extender for the thermoset resin, separating and diluting local cross-link zones and thus toughening the structure. Within the above definition of the polyarylsulphone those are preferably chosen which are miscible with suitable cyanate precursors, have high modulus and Tg and are tough.

It is convenient to use reduced viscosity (RV), measured on a solution of 1g of polymer in 100 ml of solution in dimethyl formamide at 25° C. as an indication of molecular weight, the correlation being as follows:

| RV | 0.15 | 0.25 | 0.45 | 0.92 |
|---|---|---|---|---|
| KV (number average) | 5000 | 13000 | 20000 | 60000 |

(Such molecular weights were in fact measured by vapour phase osmometry and are of course subject to the usual error range of about 10%).

The cyanate ester resin component preferably contains cyanate groups linked to aromatic nuclei. Suitably it is one or more compounds of general formula $NCOAr_ZArOCN$, where Ar is an aromatic radical, especially paraphenylene, and Z is a linking group. Examples of Z are single-atom groups such as O, S, SO, $SO_2$ and $CR_1R_2$ (where $R_1$ and $R_2$ are hydrocarbon groups containing in all up to 12 carbon atoms and are possibly linked externally to form a ring). In other examples z is larger, for example the residue of a diene such as dicyclopentadiene.

The term "component" includes monomeric cyanic esters and also oligomeric derivatives thereof.

In curable composition according to the invention a mixture of monomeric and oligomeric cyanates, in proportions in the range 0.7:1 to 1.5:1 is preferably present.

The composition may contain a catalyst for curing the cyanate resin, for example a compound of a metal such as copper, zinc or cobalt. Such a catalyst should be added shortly before curing unless it is of the "latent" type, examples of which are cobalt compounds and chelates.

Hydroxy compounds may also be added.

The curable composition may, if desired, contain one or more additional thermosettable resin components, for example epoxy resin precursors. The weight ratio of cyanate to other thermosettable components is suitably in the range 4:1 to 10:1. Suitable epoxy resin precursors have 2–4 epoxy groups in the molecule. Such additional components may be monomeric or partly condensed or a mixture of both. Hardeners and catalysts appropriate to such resins may be used.

The weight proportion of the thermoplast component in the composition is typically in the range 10–60, especially 15–40, percent, calculated on the non-volatile constituents present after curing the thermoset resin. The invention in a second aspect provides the composition in the cured state and structures made therefrom. In the cured state the thermoset and thermoplast components, the precursors of which were mutually miscible, form separate phases. There may be present a distinct continuous phase consisting substantially of one of the components, through which particles of the other are dispersed. In a preferred composition each component is present as a phase elongated in at least one dimension, for example as a network in which each extends continuously through any mass of the composition. Such a morphology, known also as co-continuous or semi-interpenetrating is, in the composition according to the invention, preferably the product of spinodal decomposition of the initial mixture as the thermoset component, in reacting with itself and any active groups on the thermoplast, becomes immiscible with the thermoplast.

The composition is particularly suitable for fabrication of structures, including load-bearing or impact resisting structures. For this purpose it may contain a reinforcing agent such as fibres. Fibers can be added short or chopped typically of mean fibre length not more than 2 cm, for example about 6 mm, typically at a concentration of 5 to 35, preferably at least 20%, by weight. For structural applications, it is preferred to use continuous fibre for example glass or carbon, especially at 30 to 70, more especially 50 to 70%, by volume.

The fibre can be organic, especially of stiff polymers such as poly paraphenylene terephthalamide, or inorganic. Among inorganic fibres glass fibres such as "E" or "S" can be used, quartz or alumina, zirconia, silicon carbide, other compound ceramics or metals. A very suitable reinforcing fibre is carbon, especially as graphite. Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, fillers such as polytetrafluoroethylene, graphite, boron nitride, mica, talc and vermiculite, pigments, nucleating agents, and stabilisers such as phosphates. The total of such materials and any fibrous reinforcing agent should be such that the composition contains at least 20% by volume of the polysulphone/thermoset mixture. The percentages of fibres and such other materials are calculated on the total composition after curing at up to 200° C.

A further procedure comprises forming incompletely cured composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158 and 102159, can be laminated together by heat and pressure, for example by compression moulding or by heated rollers, at a temperature above the curing temperature of the thermosetting resin or, if cure has already taken place, above the glass transition temperature of the mixture, conveniently at least 120° C. and typically about 180° C., and at a pressure in particular at least 0.1, preferably at least 5,MN/m².

The resulting multi-ply laminate may be anisotropic in which the fibres are oriented essentially parallel to one another or quasi-isotropic in each ply of which the fibres are oriented at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions.

EXAMPLE 1

A polymer composition was made from the following components:
25 parts by weight of polyarylsulphone:
40 mol percent PES, 60 mol percent PEES (a=1)
100% NH₂ end groups
RV 0.24; T$_g$ 198° C.
40 parts by weight of cyanate oligomer derived from the phenol-dicyclopentadiene adduct:

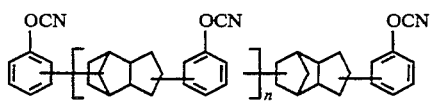

35 parts by weight of cyanate monomer: 1,1-diphenylethane-4,4'-dicyanate The cyanate oligomer was melted at 80-90 deg and the cyanate monomer was added. A solution of the polyarylsulphone in methylene chloride was mixed in. The solvent was boiled off down to a volatiles level of about 3%. A solution of copper acetylacetonate (1% in nonylphenol) providing 63 ppm by weight of metal per 100 parts of cyanate resin was stirred in for 5 min at 80-90 deg C.
The mixture was cooled to ambient temperature.

A sample of the mixture was impregnated on to unidirectional carbon fibre "HITEX 468b" (supplied by HITCO) at a resin content of 35% by weight and a fibre areal weight of 145 g/sq.m.

The tape was cured in this cycle under 100 psi pressure:
heat up at 2 deg F. per min
1 h hold at 250 deg F.
4 h at 350 deg F.; followed by
2 h post cure at 428-464 deg F.

Samples of the impregnated tape were subjected to standard tests.
The results are set out in the Table 1 following Example 4. A sample of neat polymer composition was subjected to the same curing cycle and examined microscopically. It was observed to have a co-continuous network structure.

EXAMPLE 2

Example 1 was repeated subject to the modification that the proportions of the three components were 20:50:30 respectively, the fibre was "IM7" (supplied by Hercules Inc) and the polymer had RV 0.26, Tg 200° C.

The results of the standard tests are set out in Table 1 following Example 4.

Again a sample of cured neat polymer was observed to have a co-continuous network structure.

EXAMPLE 3

Example 1 was repeated except that the polyarylsulphone had 100% hydroxy end groups and RV 0.32, Tg 203° C., and that the fibre was "IM7". Results of mechanical tests are shown in Table 1 following Example 4.

In cured neat composition a "phase-inverted" morphology was observed, with islands of predominantly thermoset resin dispersed in a continuous phase of predominantly thermoplast polymer.

EXAMPLE 4

A polymer composition was made from the following components 25 parts by weight of polyarylsulphone 80 mol percent PES, 20 mol percent PEES (a=2) over 90% OH end groups
RV 0.25; Mn estimated (from NMR) 9800; Tg 216° C.
30 parts by weight of cyanate oligomer derived from 2,2-diphenylpropane(-) 4,4'-dicyanate
25 parts by weight of cyanate monomer as in Example 1. The procedure for mixing impregnation and cure were as in Example 1. A sample of next polymer composition was subjected to the same curing cycle and examined microscopically. It was observed to have a co-continuous morphology. Results of mechanical tests are shown in Table 1.

TABLE 1

| Property | Example 1 | 2 | 3 | 4 |
|---|---|---|---|---|
| 0° Tensile St Msi | 400 | 334 | 341 | 371 |
| 0° Tensile Mod ksi | 24.2 | 24.2 | 19.7 | 24.5 |
| 0° Tensile Strain μ in/in, % | 1.7 | 1.42 | 1.7 | 1.6 |
| CAI, kei after 1300 in lb/in | 37 | 34 | 30 | 31 |
| 0° Compressive St, ksi | | | | |
| RT | 229 | 186 | 167 | 179 |
| 250° F. | 160 | 160 | 158 | 166 |
| 250° F./wet* | 145 | 154 | 150 | 168 |
| 300° F. | 162 | 181 | 132 | 154 |
| 300° F./wet* | 138 | 174 | 138 | 154 |
| G$_{1c}$ Msi | | | | |
| RT | 0.64 | 0.65 | 0.64 | 0.62 |
| 250° F./wet** | 0.47 | 0.50 | 0.43 | 0.51 |
| 300° F./wet** | 0.42 | 0.39 | 0.51 | 0.39 |
| 550° F./wet** | — | 0.16 | 0.26 | 0.17 |

Notes
*Wet = 7 days immersion at 160° F.
**Wet = 65% RH at 150° F. to saturation

EXAMPLE 5

Environmental resistance

Sample of impregnated tape from Examples 1 and 4 were laid up in a +/−45 4 ply laminate, and subjected to the curing cycle and post-cure described in Example 1.

Specimens were treated as follows:

JP4 or MEK 6 days' immersion at ambient temperatures water 14 days' immersion at 160 deg F.

then tested for tensile strength and modulus and weight increase results are shown in Table 2.

TABLE 2

|  | Control | JP4 | MEK | Water |
|---|---|---|---|---|
| Example 1 | | | | |
| Tensile strength, ksi | 25.8 | 25.3 | 26.1 | 20.0 |
| Tensile modulus, Msi | 2.22 | 2.08 | 1.89 | 1.90 |
| Weight increase, % | .. | −0.02 | 0.87 | 0.65 |
| Example 4 | | | | |
| Tensile strength, ksi | 21.8 | 21.3 | 24.0 | 16.4 |
| Tensile modulus, Msi | 2.10 | 2.11 | 1.84 | 2.06 |
| Weight increase, % | — | 0 | 0.71 | 0.81 |

We claim:

1. A curable polymer composition comprising:
   a) a polymerisable cyanate ester thermoset component selected from one or more compounds, or oligomeric species thereof, of the group consisting of:
   i) compounds of general formula
   N C O-Ar-Z-Ar-O C N where Ar is a divalent aromatic radical and z is a single atom group selected from the class consisting of O, S, SO, $So_2$, and $Cr_1R_2$ where $R_1$ and $R_2$ are hydrocarbon groups containing in all up to 12 carbon atoms and optionally are linked to form a ring structure; and
   ii) compounds of general formula

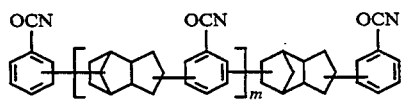

where m is up to 3 and can be fractional; and
   b) a polyarylsulphone thermoplast component containing ether- and/or thioether-linked repeating units $(PhSO_2Ph)_n$ and $(Ph)_a$ where Ph is phenylene, a and n are independently 1 to 2 and may on average be fractional and the phenylenes in $(Ph)_a$ (when a exceeds 1) are linked by a single chemical bond.

2. A composition according to claim 1 in which the polyarylsulphone contains the units:
   I X-Ph-SO$_2$-Ph-X-Ph-SO$_2$-Ph (PES): and
   II X-(Ph)$_a$-X-Ph-SO$_2$-Ph (PEES)
in a ratio of I to II between 10:90 and 55:45, wherein X is O or S and may differ from unit to unit.

3. A composition according to claim 1 in which a=1 and the ratio of I to II is in the range 35:65 to 65:35.

4. A composition according to claim 1 in which the polyarylsulphone carries end groups providing active hydrogen.

5. A composition according to claim 1 in which the polyarylsulphone has a number average molecular weight over 5000.

6. A composition according to claim 1 in which the cyanate ester component is a mixture of a dicyanate monomer and oligomer.

7. A composition according to claim 1 which contains reinforcing fibres.

8. A structure made by curing a composition according to claim 1.

9. A structure according to claim 8 in which the polymer components are combined in a network in which each extends continuously or in which islands of predominantly thermoset resin are dispersed in a continuous phase of predominantly thermoplast polymer.

10. A structure made by curing a curable polymer composition comprising a polymerisable cyanate ester thermoset component and a polyarylsulphone thermoplast component, the polyarylsulphone containing the units:
    I X-Ph-SO$_2$-Ph-X-Ph-SO$_2$-Ph (PES): and
    II X-(Ph)$_a$-X-Ph-SO$_2$-Ph (PEES)
in a ratio of I to II between 10:90 and 55:45, wherein X is O or S and may differ from unit to unit, a equals 1, the polyarylsulphone has a number average molecular weight over 5000 and carries either NH$_2$ or hydroxy end groups, and the cyanate ester thermoset component is a cyanate oligomer derived from a phenol-dicyclopentadiene adduct, the components being combined in a network in which each extends continuously or in which islands of predominantly thermoset resin are dispersed in a continuous phase of predominantly thermoplast polymer.

* * * * *